US012608547B2

(12) United States Patent
Zhang

(10) Patent No.: US 12,608,547 B2
(45) Date of Patent: Apr. 21, 2026

(54) METHOD AND DEVICE FOR SEGMENTING WORD BASED ON CROSS-LANGUAGE DATA AUGMENTATION, AND STORAGE MEDIUM

(71) Applicant: BIGO TECHNOLOGY PTE. LTD., Singapore (SG)

(72) Inventor: Jianning Zhang, Singapore (SG)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 309 days.

(21) Appl. No.: 18/260,889

(22) PCT Filed: Jan. 10, 2022

(86) PCT No.: PCT/CN2022/071144
§ 371 (c)(1),
(2) Date: Jul. 10, 2023

(87) PCT Pub. No.: WO2022/148467
PCT Pub. Date: Jul. 14, 2022

(65) Prior Publication Data
US 2024/0062009 A1 Feb. 22, 2024

(30) Foreign Application Priority Data

Jan. 11, 2021 (CN) .......................... 202110034450.2

(51) Int. Cl.
*G06F 40/289* (2020.01)
*G06F 40/274* (2020.01)
*G06F 40/40* (2020.01)
(52) U.S. Cl.
CPC .......... *G06F 40/289* (2020.01); *G06F 40/274* (2020.01); *G06F 40/40* (2020.01)

(58) Field of Classification Search
CPC ...... G06F 40/289; G06F 40/274; G06F 40/40; G06F 40/30; G06F 9/454; G06F 40/211; G06F 40/284
See application file for complete search history.

(56) References Cited

U.S. PATENT DOCUMENTS

2014/0089340 A1* 3/2014 Zhu ........................ G06F 16/245
707/769
2016/0027433 A1* 1/2016 Itoh ........................ G10L 15/197
704/9
(Continued)

FOREIGN PATENT DOCUMENTS

CN 111090727 A * 5/2020 ............. G10L 15/26
CN 111144102 A 5/2020
(Continued)

OTHER PUBLICATIONS

International Search Report of the International Searching Authority for State Intellectual Property Office of the People's Republic of China in PCT application No. PCT/CN2022/071144 issued on Mar. 29, 2022, which is an international application to which this application claims priority.

(Continued)

*Primary Examiner* — Bhavesh M Mehta
*Assistant Examiner* — Jangwoen Lee
(74) *Attorney, Agent, or Firm* — Kolitch Romano Dascenzo Gates LLP

(57) ABSTRACT

Provided is a method and a device for segmenting words, and a storage medium. The method includes: acquiring a plurality of groups of high-resource language (HRL) data, and acquiring a plurality of groups of first word segmentation language data by processing the plurality of groups of HRL data; acquiring a plurality of groups of low-resource language (LRL) data, acquiring a plurality of candidate word segments, and selecting second word segmentation language (Continued)

data from the plurality of candidate word segments; acquiring a word segmentation model by training based on the second word segmentation language data, and outputting a plurality of candidate word segmentation results; and selecting the candidate word segmentation result with a highest matching degree as a word segmentation result based on a matching degree between each of the candidate word segmentation results and the first word segmentation corpus.

17 Claims, 6 Drawing Sheets

(56) References Cited

U.S. PATENT DOCUMENTS

| | | | | |
|---|---|---|---|---|
| 2020/0098352 | A1* | 3/2020 | Feinstein | ............. G10L 15/063 |
| 2022/0171941 | A1* | 6/2022 | Ouyang | ............... G06N 3/0895 |

FOREIGN PATENT DOCUMENTS

| | | | | |
|---|---|---|---|---|
| CN | 111382568 | A | * 7/2020 | ............. G06N 3/045 |
| CN | 111460804 | A | 7/2020 | |
| CN | 112765977 | A | 5/2021 | |
| WO | 2020242567 | A1 | 12/2020 | |

OTHER PUBLICATIONS

Extended European Search Report Communication Pursuant to Rule 62 EPC for European Application No. 22736628.3 dated Jun. 10, 2024, which is a foreign counterpart application to this application.

Hedderich, Michael A., et al., "A Survey on Recent Approaches for Natural Language Processing in Low—Resource scenarios", arxiv.org, Cornell University Library, 201Olin Library Cornell University Ithaca, NY14853, section 4, Oct. 23, 2020.

Lin, Yu-Hsiang et al., "Choosing Transfer Languages for Cross—Lingual Learning", arxiv.org, Cornell University Library, 201Olin Library Cornell University Ithaca, NY14853, abstract, May 29, 2019.

Xu, Jingjing, et al., "Transfer Deep Learning for Low-Resource Chinese Word Segmentation with a Novel Neural Network", SAT 2015 18th International Conference, Austin, TX, USA, Sep. 24-27, 2015; [Lecture Notes in Computer Science; Lect.Notes Computer], Springer, Berlin, Heidelberg, pp. 721-730, ISBN: 978-3-540-74549-5, abstract, p. 722, paragraph 2-paragraph 3, Jan. 5, 2018.

* cited by examiner

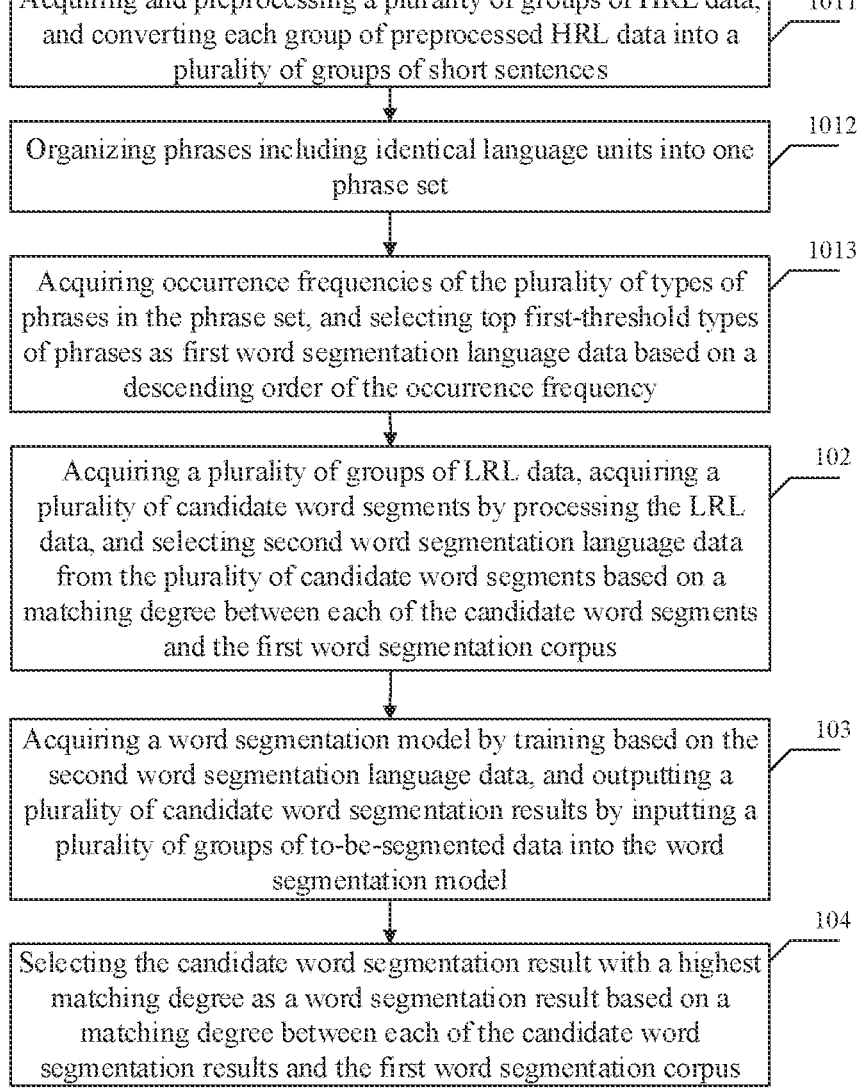

Acquiring and preprocessing a plurality of groups of HRL data, and converting each group of preprocessed HRL data into a plurality of groups of short sentences  — 1011

Organizing phrases including identical language units into one phrase set  — 1012

Acquiring occurrence frequencies of the plurality of types of phrases in the phrase set, and selecting top first-threshold types of phrases as first word segmentation language data based on a descending order of the occurrence frequency  — 1013

Acquiring a plurality of groups of LRL data, acquiring a plurality of candidate word segments by processing the LRL data, and selecting second word segmentation language data from the plurality of candidate word segments based on a matching degree between each of the candidate word segments and the first word segmentation corpus  — 102

Acquiring a word segmentation model by training based on the second word segmentation language data, and outputting a plurality of candidate word segmentation results by inputting a plurality of groups of to-be-segmented data into the word segmentation model  — 103

Selecting the candidate word segmentation result with a highest matching degree as a word segmentation result based on a matching degree between each of the candidate word segmentation results and the first word segmentation corpus  — 104

FIG. 2

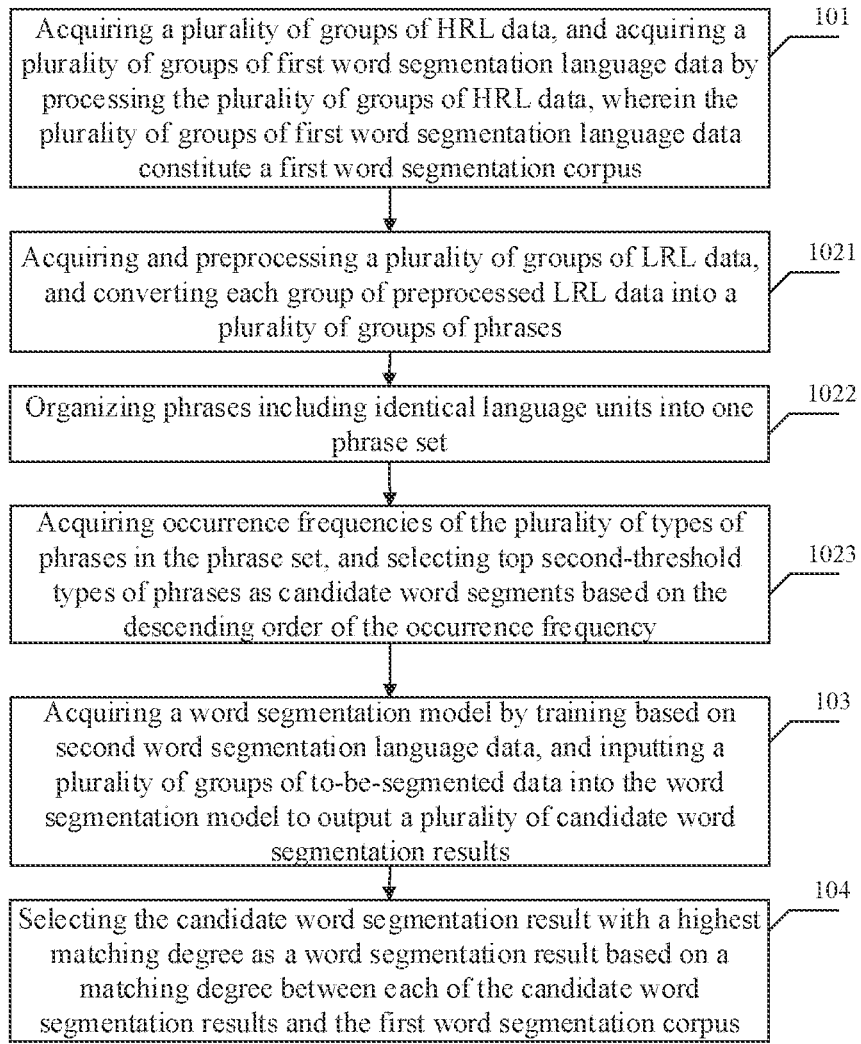

101   Acquiring a plurality of groups of HRL data, and acquiring a plurality of groups of first word segmentation language data by processing the plurality of groups of HRL data, wherein the plurality of groups of first word segmentation language data constitute a first word segmentation corpus 1021   Acquiring and preprocessing a plurality of groups of LRL data, and converting each group of preprocessed LRL data into a plurality of groups of phrases 1022   Organizing phrases including identical language units into one phrase set 1023   Acquiring occurrence frequencies of the plurality of types of phrases in the phrase set, and selecting top second-threshold types of phrases as candidate word segments based on the descending order of the occurrence frequency 103   Acquiring a word segmentation model by training based on second word segmentation language data, and inputting a plurality of groups of to-be-segmented data into the word segmentation model to output a plurality of candidate word segmentation results 104   Selecting the candidate word segmentation result with a highest matching degree as a word segmentation result based on a matching degree between each of the candidate word segmentation results and the first word segmentation corpus

FIG. 3

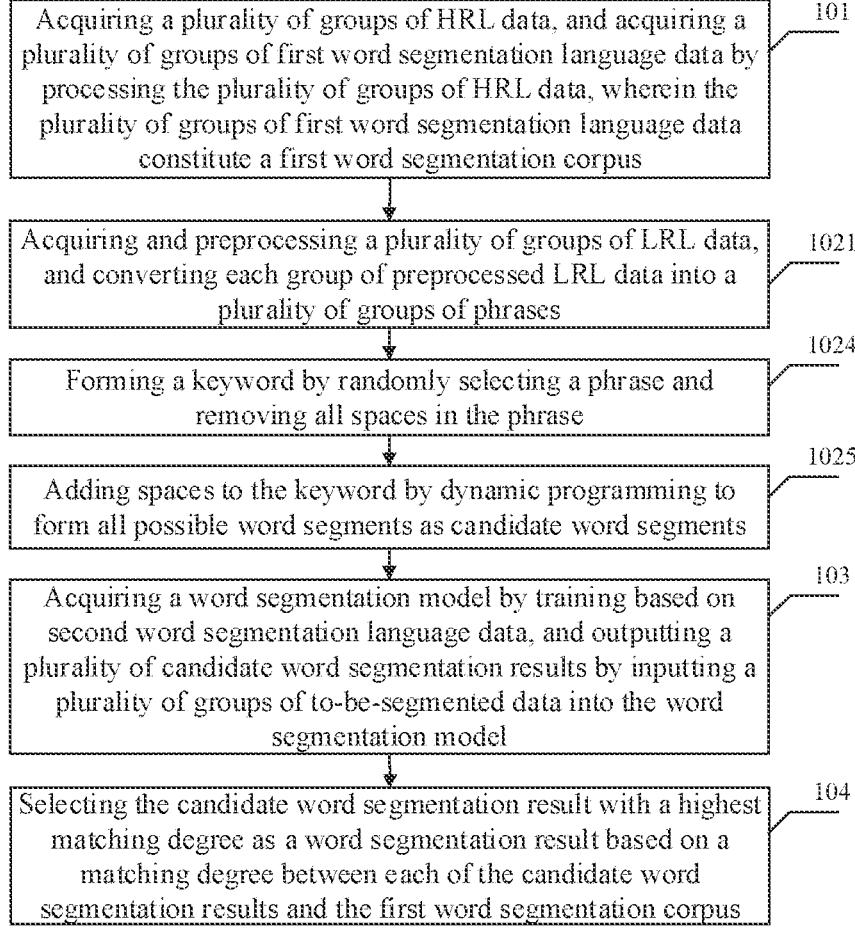

Acquiring a plurality of groups of HRL data, and acquiring a plurality of groups of first word segmentation language data by processing the plurality of groups of HRL data, wherein the plurality of groups of first word segmentation language data constitute a first word segmentation corpus — 101

Acquiring and preprocessing a plurality of groups of LRL data, and converting each group of preprocessed LRL data into a plurality of groups of phrases — 1021

Forming a keyword by randomly selecting a phrase and removing all spaces in the phrase — 1024

Adding spaces to the keyword by dynamic programming to form all possible word segments as candidate word segments — 1025

Acquiring a word segmentation model by training based on second word segmentation language data, and outputting a plurality of candidate word segmentation results by inputting a plurality of groups of to-be-segmented data into the word segmentation model — 103

Selecting the candidate word segmentation result with a highest matching degree as a word segmentation result based on a matching degree between each of the candidate word segmentation results and the first word segmentation corpus — 104

FIG. 4

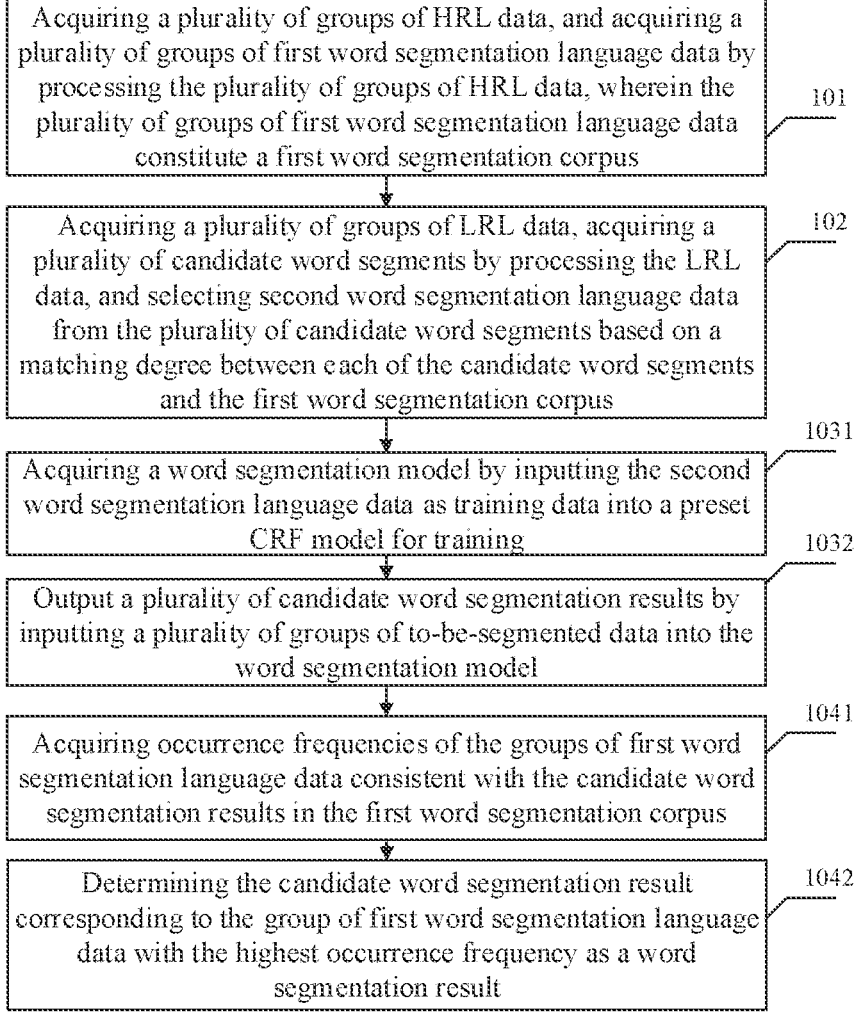

Acquiring a plurality of groups of HRL data, and acquiring a plurality of groups of first word segmentation language data by processing the plurality of groups of HRL data, wherein the plurality of groups of first word segmentation language data constitute a first word segmentation corpus — 101

Acquiring a plurality of groups of LRL data, acquiring a plurality of candidate word segments by processing the LRL data, and selecting second word segmentation language data from the plurality of candidate word segments based on a matching degree between each of the candidate word segments and the first word segmentation corpus — 102

Acquiring a word segmentation model by inputting the second word segmentation language data as training data into a preset CRF model for training — 1031

Output a plurality of candidate word segmentation results by inputting a plurality of groups of to-be-segmented data into the word segmentation model — 1032

Acquiring occurrence frequencies of the groups of first word segmentation language data consistent with the candidate word segmentation results in the first word segmentation corpus — 1041

Determining the candidate word segmentation result corresponding to the group of first word segmentation language data with the highest occurrence frequency as a word segmentation result — 1042

FIG. 5

METHOD AND DEVICE FOR SEGMENTING WORD BASED ON CROSS-LANGUAGE DATA AUGMENTATION, AND STORAGE MEDIUM

CROSS-REFERENCE TO RELATED APPLICATIONS

The present disclosure is a U.S. national phase application of international application No. PCT/CN2022/071144, filed on Jan. 10, 2022, which claims priority to Chinese Patent Application No. 202110034450.2, filed with the China National Intellectual Property Administration (CNIPA) on Jan. 11, 2021, the entire contents of which are incorporated herein by reference.

TECHNICAL FIELD

Embodiments of the present disclosure relate to the technical field of word segmentation, and in particular, relate to a method and a device for segmenting words based on cross-language data augmentation, and a storage medium.

BACKGROUND OF THE INVENTION

Due to the development of information technology, it is a common demand in the information era to provide search and recommendation services for users. When the search and recommendation services are provided for the users, it is necessary to perform appropriate word segmentation on sentences. In a traditional word segmentation task, for English sentences containing spaces, word segmentation is performed based on the spaces. However, different from the assumption of the traditional word segmentation task, users in practice do not strictly follow the grammar of word segmentation, but often input a plurality of words together. Incorrect word segmentation affects execution of downstream tasks, such as entity recognition and semantic recognition. Therefore, a special word segmentation model needs to be trained based on a business scenario. A large amount of language data is needed to train the word segmentation model. However, for some countries and regions with relatively scarce data, it is difficult to acquire language data resources in the early stage of business due to insufficient user data and lack of corresponding annotation resources.

SUMMARY OF THE INVENTION

The embodiments of the present disclosure provide a method and a device for segmenting words based on cross-language data augmentation and a storage medium.

According to some embodiments of the present disclosure, a method for segmenting words based on cross-language data augmentation is provided The method includes:

acquiring a plurality of groups of HRL data, and acquiring a plurality of groups of first word segmentation language data by processing the plurality of groups of HRL data, wherein the plurality of groups of first word segmentation language data constitute a first word segmentation corpus;

acquiring a plurality of groups of LRL data, acquiring a plurality of candidate word segments by processing the LRL data, and selecting second word segmentation language data from the plurality of candidate word segments based on a matching degree between each of the candidate word segments and the first word segmentation corpus;

acquiring a word segmentation model by training based on the second word segmentation language data, and outputting a plurality of candidate word segmentation results by inputting a plurality of groups of to-be-segmented data into the word segmentation model; and selecting the candidate word segmentation result with a highest matching degree as a word segmentation result based on a matching degree between each of the candidate word segmentation results and the first word segmentation corpus.

According to some embodiments of the present disclosure, a device for segmenting words based on cross-language data augmentation is provided. The device includes a memory and one or more processors, wherein the memory is configured to store one or more programs; and the one or more processors, when loading and running the one or more programs, are caused to perform the method for segmenting words based on cross-language data augmentation according to the above embodiment.

According to some embodiments of the present disclosure, a non-volatile computer-readable storage medium containing a computer-executable instruction is provided. The computer-executable instruction, when loaded and run by a computer processor, causes the computer processor to perform the method for segmenting words based on cross-language data augmentation according to the above embodiment.

BRIEF DESCRIPTION OF DRAWINGS

FIG. 2 is a flowchart of another method for segmenting words based on cross-language data augmentation according to some embodiments of the present disclosure;

FIG. 3 is a flowchart of another method for segmenting words based on cross-language data augmentation according to some embodiments of the present disclosure;

FIG. 4 is a flowchart of another method for segmenting words based on cross-language data augmentation according to some embodiments of the present disclosure;

FIG. 5 is a flowchart of another method for segmenting words based on cross-language data augmentation according to some embodiments of the present disclosure;

DETAILED DESCRIPTION

Figure 1:
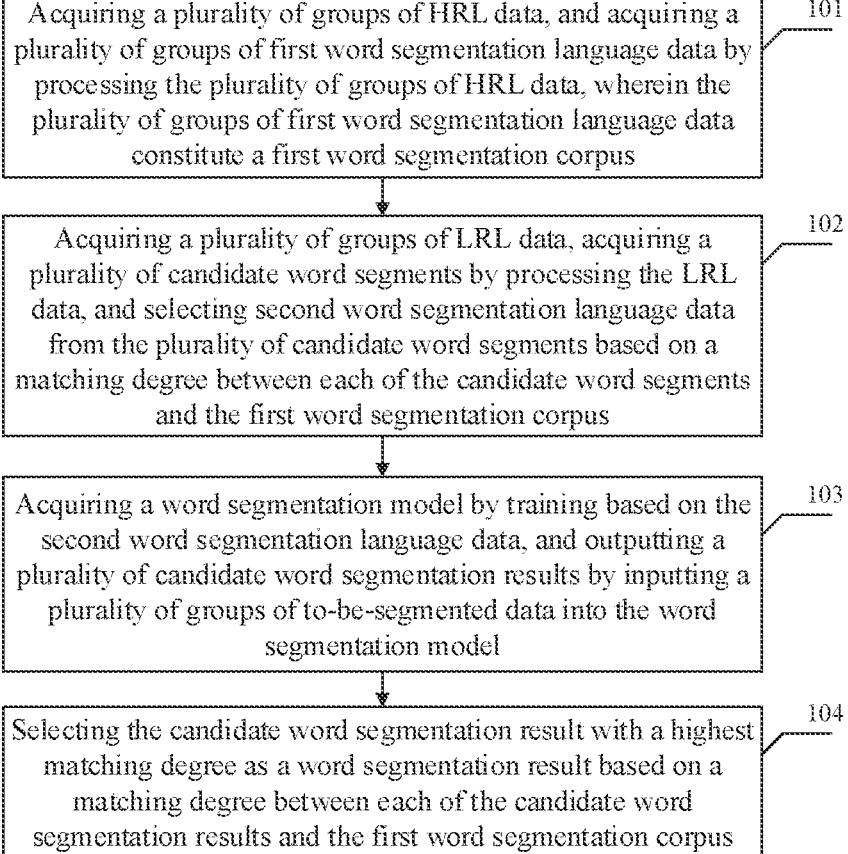
FIG. 1 is a flowchart of a method for segmenting words based on cross-language data augmentation according to some embodiments of the present disclosure.

To make the objective, technical solutions, and advantages of the present disclosure clearer, the specific embodiments of the present disclosure are further described in detail below with reference to the accompanying drawings. It should be understood that the specific embodiments described herein are merely intended to explain the present disclosure, rather than to limit the present disclosure. It should also be noted that for convenience of description, only partial content related to the present disclosure rather than all the content is shown in the accompany drawings. Before exemplary embodiments are described in more detail, it should be noted that some exemplary embodiments are described as processes or methods depicted as flow-charts. Although the flowchart shows operations (or steps) as a sequential process, many of the operations may be per-formed in parallel, concurrently, or simultaneously. In addi-tion, the order of the operations may be rearranged. The process may be terminated when its operations are complete or may further have additional steps not included in the accompanying drawing. The process may correspond to a method, function, procedure, subroutine, subprogram, or the like.

Related methods for segmenting words are mainly clas-sified into a dictionary method based on probability and statistics and a model method based on a neural network. Main logic of the dictionary method is to acquire sufficient words and their word frequencies, and acquire a final word segmentation result by calculating probabilities of different word segment combinations. Main logic of the model method is to use a sequence labeling method to calculate a global optimal sequence combination through a transition probability of features, and convert the sequence into a word segmentation result. Both methods need sufficient training language data. However, it is difficult to acquire training language data in low-resource regions. A popular solution for the low-resource regions is to use a multilingual bidi-rectional encoder representation from transformers (BERT) model provided by Google for word segmentation. A model pre-trained with a large dataset is downloaded and fine-tuned with a small dataset for each low-resource language (LRL). The BERT model converts text into vectors, which are input as features into a subsequent model for prediction. However, word segmentation has been performed on the text converted by the pre-trained BERT model provided by Google, and the vectors are also based on words. Therefore, the model cannot be directly applied to a word segmentation task. In addition, the pre-trained BERT model is trained based on formal corpora (such as news and blog posts) and lacks unique context generated in a product's social ecology.

The embodiments of the present disclosure provide a method, an apparatus, and a device for segmenting words based on cross-language data augmentation and a storage medium. In the embodiments of the present disclosure, HRL data is first acquired and processed to acquire word seg-mentation language data, and then LRL data is acquired and processed to acquire candidate word segments. The candi-date word segment that has a high matching degree with the word segmentation language data is selected as word seg-mentation language data of the LRL data from the candidate word segments based on the word segmentation language data acquired from the HRL data. A word segmentation model is trained based on the low-resource word segmen-tation language data, such that candidate word segmentation results can be automatically output for the LRL data through the model. A word segmentation result is selected based on a matching degree between each of the candidate word segmentation results and the word segmentation language data of the HRL data.

In the embodiments of the present disclosure, the word segmentation model and word segmentation training data in a low-resource region (mainly a region in which a minority language or dialect is spoken) are automatically generated through a machine learning technology. A specific manner is as follows. First, a batch of word segmentation language data of an HRL (for example, English) is generated by using natural input data of a user, and semi-manual verification is performed. Then, a batch of word segmentation language data in a low-resource region is automatically generated by using this solution, and automatic verification is performed by using the language data of the HRL. Finally, the word segmentation model of the LRL is trained by using a global high-frequency lexicon. In the embodiments, model training data of the LRL is automatically expanded and verified by using the language data of the HRL, such that imbalance of data resources and annotation resources between different languages is resolved, and a more lightweight and more efficient solution is provided for a multinational product to quickly iterate the word segmentation model in the LRL. In addition, because training language data of the LRL is automatically generated, only the HRL needs to be mainly maintained in subsequent updates and maintenance costs are reduced.

Detailed descriptions are provided below.

FIG. 1 is a flowchart of a method for segmenting words based on cross-language data augmentation according to some embodiments of the present disclosure. The method for segmenting words based on cross-language data aug-mentation according to some embodiments of the present disclosure is performed by an apparatus for segmenting words based on cross-language data augmentation. The apparatus for segmenting words based on cross-language data augmentation is implemented through hardware and/or software, and integrated in a computer device.

The following uses an example in which the apparatus for segmenting words based on cross-language data augmenta-tion performs the method for segmenting words based on cross-language data augmentation for description. Referring to FIG. 1, the method for segmenting words based on cross-language data augmentation includes the following processes.

In 101, a plurality of groups of HRL data are acquired and processed to acquire a plurality of groups of first word segmentation language data, wherein the plurality of groups of first word segmentation language data constitute a first word segmentation corpus.

In some embodiments of the present disclosure, HRLs are languages having more language data and annotation data, and generally speaking, more widely used languages, such as English and Chinese. In contrast to the HRLs, LRLs are languages that lack language data and annotation data, and are common in minority languages such as Spanish, Ger-man, French, Vietnamese, and Thai, or various dialects such as Cantonese, Hakka, and Teochew.

Application of the present disclosure is based on an assumption that data of different languages for one product has similar data distributions. In actual application sce-narios, this assumption is valid in the use of many multi-national products, because users in different countries use a same set of underlying services, such as input methods and tweet topics, and have similar language ecosystems, such as some popular words and habitual expressions.

Acquiring the HRL data is to acquire natural user input data in an HRL region, such as user search data and user comment data. In some embodiments of the present disclo-sure, a scenario of acquiring the HRL data is, in a video client applied in an HRL country, acquiring comment data of a registered user on a video in the video client when the user plays the video through the video client, or search data when the user searches for a video through the video client. It can be easily understood that the comment data is usually a paragraph. In some embodiments, the paragraph contains a plurality of sentences composed of characters or words or is text composed of characters or words. Certainly, the comment data may alternatively contain other language units such as emoticons. The search data often contains a small quantity of language units and is usually reflected by keywords, including names, time, and other data expressions, usually phrases or short sentences. In some other embodiments, a scenario of acquiring the HRL data is converting voice data in a short video into text as the HRL data or acquiring language data in a published thesis from a thesis website as the HRL data. In some other embodiments, the HRL data is various language data that can be easily acquired.

In the embodiments of the present disclosure, the batch of HRL data is cleaned and converted to generate a plurality of groups of short sentences. Each group of the short sentences includes a plurality of phrases each having a same quantity of language units. For example, HRL data "happy birthday to you" is converted into a short sentence with 2 language units, i.e., "happy birthday, birthday to, to you". In the short sentence, "happy birthday", "birthday to", and "to you" are three phrases in the short sentence set. In the case that "happy birthday to you" is converted into a short sentence with 3 language units, the short sentence is "happy birthday to, birthday to you". In the case that "happy birthday to you" is converted into a short sentence with 1 language unit, the short sentence is "happy, birthday, to, you". "Happy", "birthday", "to", and "you" are phrases in the short sentence "happy, birthday, to, you". In the embodiments of the present disclosure, a language unit is a corresponding word or a character in different languages or different language scenarios. For example, in Chinese, a sentence contains a plurality of characters, and each character exists independently as a language unit. For example, in English, a sentence contains a plurality of words, and each word exists independently as a language unit.

The acquired HRL data generally includes paragraphs or sentences. A paragraph or a sentence is used as a group of HRL data. Each group of HRL data is processed to acquire the first word segmentation language data. For example, in English-speaking countries, acquired language data of an English-speaking country is HRL data because English is used as a native language by many countries and English is an international language. The acquired HRL data is a sentence such as "happy birthday to you" or a paragraph such as "Today is a good day. I prepared a delicious dinner". "Happy birthday to you" and "Today is a good day. I prepared a delicious dinner" are used as different groups of HRL data and processed to acquire the first word segmentation language data. In the present disclosure, there is no fixed rule for grouping HRL data. The plurality of groups of HRL data described in the embodiments represent that each sentence or a paragraph composed of a plurality of sentences may be processed as an independent group of HRL data to be the first word segmentation language data.

In another embodiment, a manner of processing each group of HRL data to acquire a group of first word segmentation language data is shown by 1011 to 1013 in FIG. 2. In 1011, the plurality of groups of HRL data are acquired and preprocessed, and each group of preprocessed HRL data is converted into a plurality of groups of short sentences. Each group of short sentences includes a plurality of phrases each with a same quantity of language units. In 1012, phrases including identical language units are grouped into one phrase set. The phrase set includes a plurality of types of phrases. In 1013, occurrence frequencies of the plurality of types of phrases in the phrase set is acquired, and top m types of phrases are selected as the first word segmentation language data based on the descending order of the occurrence frequency.

In some embodiments, m is a natural integer, such as 1, 2, or 3. In a solution of the embodiments, m is 3.

In some embodiments, the preprocessing includes: converting a punctuation mark in the HRL data based on a first preset rule, and converting an emoticon in the HRL data into a language unit based on a second preset rule. During the preprocessing, uniform conversion rules are used to convert some special language units in the HRL data, including the punctuation mark, the emoticon, and the like. For example, in the case that the HRL data is acquired from comment data and the comment data carries an emoticon, the emoticon may be converted into a language unit corresponding to a meaning of the emoticon by recognizing the meaning. For example, an emoticon corresponding to "happy" is a smiley. In the case that the smiley exists in the comment data, the smiley is converted into the language unit "happy". Acquiring the meaning of the emoticon and converting the emoticon into the language unit corresponding to the meaning is the second preset rule in the embodiments of the present disclosure. In another embodiment, the second preset rule may be to preset a mapping relationship between the emoticon and the language unit, and the corresponding language unit may be more directly acquired through the emoticon. In still another embodiment, a manner of preprocessing the emoticon is not necessarily conversion, and the emoticon may be directly deleted. Similarly, for the conversion of the punctuation mark based on the first preset rule, for example, a full stop is used to express the end of a complete sentence, but Chinese and English expressions of the full stop are different. The first preset rule makes the punctuation mark have a unified expression.

In some embodiments, it is assumed that a group of preprocessed HRL data is "jin tian gei peng you guo sheng ri, zhu sheng ri kuai le" (today is the birthday of my friend, happy birthday to my friend). The HRL data may be converted into a plurality of groups of short sentences. The plurality of groups of short sentences correspond to different quantities of consecutive language units. In the case that the HRL data is converted into a short sentence with 2 consecutive language units, the short sentence is "jin tian, tian gei, gei peng, peng you, you guo, guo sheng, sheng ri, ri zhu, zhu sheng, sheng ri, ri kuai, kuai le". Similarly, a short sentence with 3 consecutive language units may also be acquired, which is "jin tian gei, tian gei peng, gei peng you, peng you guo, you guo sheng, guo sheng ri, sheng ri". Each group of short sentences includes a plurality of phrases. For example, "jin tian gei" and "gei peng you" are phrases described in the embodiments. It can be understood that the phrases in each group of short sentences have the same quantity of consecutive language units. In the above phrases, phrases including identical language units are grouped into a phrase set. For example, the above phrases containing "sheng ri" may be grouped into a phrase set. It should be noted that the grouping rule in the present disclosure defines the identical language units and the identical order of the language units, but spaces between the language units are not considered. For example, the short sentences are "I (space) like you", "I like (space) you", and "I (space) like (space) you", in the above three short sentences, in the case that the spaces are removed, the short sentences are all "I like you". Therefore, a language unit string "I like you" is determined as a keyword to group phrases into the phrase set. The phrase set includes a plurality of types of phrases. For example, "I like you" is determined as a keyword. All phrases that can become the keyword upon removing of spaces constitute a phrase set. Because positions of the spaces in the phrases are different, the phrases are different although the keyword is the same. In other words, there are different types of phrases. For example, "I (space) like you" and "I like (space) you" are two different types of phrases. It is assumed that a phrase set includes the following phrases: "I (space) like you", "I (space) like you", "I like (space) you", and "I (space) like (space) you". It can be learned that "I (space) like you" occurs twice and is more frequent than the other two types of phrases. In the embodiments, the top m types of phrases are selected as first word segmentation language data based on the descending order of occurrence frequency. In an implementation, m is 3. In another implementation, m may be another value, such as 5 or 4. This is not limited in the present disclosure. For another example, a phrase set includes the following phrases: "I (space) like you", "I (space) like you", "I like (space) you", "I (space) like (space) you", and "I (space) like (space) you". In the case that m is 2, "I (space) like you" and "I (space) like (space) you" are selected as a group of first word segmentation language data. Because a sufficient amount of HRL data is acquired, a large quantity of groups of first word segmentation language data are acquired. A sufficient quantity of groups of first word segmentation language data constitutes a corpus, i.e., the first word segmentation corpus described in the present disclosure.

In another implementation, selecting the top m types of phrases as the first word segmentation language data based on the descending order of the occurrence frequency includes: selecting the top m types of phrases as candidate first word segmentation language data based on the descending order of the occurrence frequency; randomly selecting a phrase from the phrase set, and forming a keyword by removing all spaces in the phrase; outputting predicted word segmentation language data by inputting the keyword into a preset word segmentation model; and comparing the candidate first word segmentation language data with the predicted word segmentation language data, and in response to the candidate first word segmentation language data being the same as the predicted word segmentation language data, determining the candidate first word segmentation language data as the first word segmentation language data; or in response to the candidate first word segmentation language data being different from the predicted word segmentation language data, adjusting the candidate first word segmentation language data, and determining the adjusted candidate first word segmentation language data as the first word segmentation language data.

M is a preset value and is a natural number. For example, m is 2, 3, or 5, which is not limited in the present disclosure. During the foregoing operations, semi-automatic verification is performed to acquire the first word segmentation language data. That is, the top m types of phrases selected based on the descending order of occurrence frequency are not directly determined as the first word segmentation language data and included in the first word segmentation corpus, but are determined as candidate first word segmentation language data, and the candidate first word segmentation language data is verified. The verification method includes randomly selecting a phrase from the phrase set, and removing all spaces in the phrase to form a keyword. For example, a phrase set corresponding to four consecutive language units ABCD includes phrases "A (space) BC (space) D" and "A (space) BCD". The phrase "A (space) BC D" is randomly selected, and spaces are removed to form a keyword ABCD. The keyword ABCD is input into the preset word segmentation model. The preset word segmentation model is a word segmentation model that has been disclosed and used in the related art. The preset word segmentation model outputs a plurality of groups of predicted word segmentation language data for the keyword ABCD, for example, outputs "A (space) BC (space) D", "A (space) BCD", and "AB (space) CD". The candidate first word segmentation language data is compared with the predicted word segmentation language data. In other words, "A (space) BC (space) D" and "A (space) BCD" are compared with "A (space) BC (space) D", "A (space) BCD", and "AB (space) CD". "A (space) BC (space) D" and "A (space) BCD" each have a corresponding group of predicted word segmentation language data. "A (space) BC (space) D" and "A (space) BCD" are determined as the first word segmentation language data. In another case, it is assumed that the candidate first word segmentation language data is "A (space) BC (space) D", "A (space) BCD", and "AB (space) CD", and the predicted word segmentation language data is "A (space) BC (space) D" and "A (space) BCD". It can be learned that "AB (space) CD" in the candidate first word segmentation language data does not correspond to a group of predicted word segmentation language data. Therefore, "AB (space) CD" is not determined as the first word segmentation language data, and "A (space) BC (space) D" and "A (space) BCD" are determined as the first word segmentation language data.

In 102, a plurality of groups of LRL data are acquired and processed to acquire a plurality of candidate word segments, and second word segmentation language data is selected from the plurality of candidate word segments based on a matching degree between each of the candidate word segments and the first word segmentation corpus.

The LRL data exists relative to the HRL data. As mentioned above, the HRLs are languages having more language data and annotation data, and generally speaking, more widely used languages. The LRLs are languages that are less used, have few audiences, and lack language data.

Similarly, acquiring the LRL data is to acquire search data and comment data of users in an LRL region. A scenario of acquiring the LRL data is the same as the scenario of acquiring the HRL data. For example, in a video client applied in an LRL country, comment data of a registered user on a video in the video client when the user plays the video through the video client, or search data when the user searches for a video through the video client is acquired. It can be easily understood that the comment data is usually a paragraph. In some embodiments, the paragraph contains a plurality of sentences composed of characters or words, or is text composed of characters or words. Certainly, the comment data may alternatively contain other language units such as emoticons. The search data often contains a small quantity of language units and is usually reflected by keywords, including names, time, and other data expressions, usually phrases or short sentences. In some other embodiments, a scenario of acquiring the LRL data is converting voice data in a short video into text as the LRL data. In some other embodiments, the LRL data is various language data that can be easily acquired, such as subtitles of local news broadcasts.

Similarly, in the embodiments of the present disclosure, the acquired LRL data can be cleaned and converted. Cleaning and converting the data is essentially preprocessing the data. The preprocessed LRL data is processed to acquire candidate word segments. In the embodiments of the present disclosure, the candidate word segments are intended to subsequently select the second word segmentation language data, i.e., word segmentation language data of the LRL data, from the candidate word segments.

In some embodiments, step 102 is further refined. As shown by steps 1021 to 1023 in FIG. 3, that the plurality of groups of LRL data are acquired and processed to acquire the plurality of candidate word segments includes: in 1021, acquiring and processing the plurality of groups of LRL data; preprocessing the plurality of groups LRL data; converting each group of preprocessed LRL data into a plurality of groups of phrases, wherein each group of the short sentences includes a plurality of phrases each with a same quantity of language units; in 1022, organizing phrases including identical language units into one phrase set, wherein the phrase set includes a plurality of types of phrases; and in 1023, acquiring occurrence frequencies of the plurality of types of phrases in the phrase set, and selecting top n types of phrases as the candidate word segments based on the descending order of the occurrence frequency.

In some embodiments of the present disclosure, a manner of preprocessing the LRL data is the same as that of preprocessing the HRL data, including: converting a punctuation mark in the LRL data based on the first preset rule, and converting an emoticon in the LRL data into a language unit based on the second preset rule. During the preprocessing, special language units in the acquired LRL data are converted, which is the same as the HRL data. For example, in the case that the LRL data is acquired from comment data and the comment data carries an emoticon, the emoticon may be converted into a language unit corresponding to a meaning of the emoticon by recognizing the meaning. For example, an emoticon corresponding to "happy" is a smiley. In the case that the smiley exists in the comment data, the smiley is converted into the language unit "happy". Acquiring the meaning of the emoticon and converting the emoticon into the language unit corresponding to the meaning is the second preset rule in the embodiments of the present disclosure. In another embodiment, the second preset rule may be to preset a mapping relationship between the emoticon and the language unit, and the corresponding language unit may be more directly acquired through the emoticon. In still another embodiment, a manner of preprocessing the emoticon is not necessarily conversion, and the emoticon may be directly deleted. Similarly, for the conversion of the punctuation mark based on the first preset rule, for example, a full stop is used to express the end of a complete sentence, but Chinese and English expressions of the full stop are different. The first preset rule makes the punctuation mark have a unified expression.

In some embodiments, a manner of converting the preprocessed LRL data into the short sentences is the same as that of converting the preprocessed HRL data into the short sentences. Each group of short sentences includes a plurality of phrases each with the same quantity of language units.

For example, the LRL data is "ABCDEFADEGCABCD", wherein each English letter represents a language unit. In the embodiments, the language unit is a word with a substantial meaning, excluding symbols, spaces, and the like. Converting "ABCDEFADEGCABCD" into a plurality of groups of short sentences indicates that "ABCDEFADEGCABCD" is converted into a short sentence with 4 consecutive language units, a short sentence 3 consecutive language units, and a short sentence with another quantity of consecutive language units. Herein, "ABCDEFADEGCABCD" is converted into the short sentence with 4 consecutive language units: "ABCD, BCDE, CDEF, DEFA, EFAD, FADE, ADEG, DEGC, EGCA, GCAB, CABC, ABCD". It can be learned that the group of short sentence includes 12 phrases, and each phrase has 4 consecutive language units. For ease of understanding, in the above expression of the LRL data, spaces are actually removed and only the language units are represented. In practice, however, there may be a space between any two language units. Based on the above group of phrases, "AB (SPACE) CDE FAD EGCABC (SPACE) D" is actually present. In this case, a group of short sentence with 4 consecutive language units is "AB (space) CD, B (space) CDE, CDE (space) F, DE (space) FA, EFAD, FAD (space) E, AD (space) EG, DEGC, EGCA, GCAB, CABC, ABC (space) D".

In some embodiments, the phrases including identical language units are actually grouped into the phrase set, and the phrase set includes a plurality of types of phrases. In the above example, the phrases in "AB (space) CD, B (space) CDE, CDE (space) F, DE (space) FA, EFAD, FAD (space) E, AD (space) EG, DEGC, EGCA, GCAB, CABC, ABC (space) D" are grouped. For example, the short sentence composed of substantive language units upon removing the space in "AB (space) CD" is "ABCD", the short sentence composed of substantive language units upon removing the space in "B (space) CDE" is "BODE", and it is obvious that the language units are not exactly the same. It is easy to find that in the above group of short sentences, language units of "AB (space) CD" and "ABC (space) D" are substantially identical. Therefore, the two short sentences are grouped into the phrase set. The phrase set includes two types of phrases: "AB (space) CD" and "ABC (space) D".

Occurrence frequencies of the plurality of types of phrases in the phrase set is acquired, and top n types of phrases are selected as the candidate word segments based on the descending order of the occurrence frequency. For example, in the phrase set including "AB (space) CD", there are only two types of phrases, and a quantity of each of the two types of phrases is 1. In other words, the occurrence frequencies of "AB (space) CD" and "ABC (space) D" are identical in the phrase set. In another embodiment, for example, a phrase set includes the following phrases: "AB (space) CD", "ABC (space) D", "ABC (space) D", "ABC (space) D", "AB (space) CD", "A (space) BCD", and "A (space) BC (space) D". The above phrase set includes 7 phrases in total and 4 types of phrases. A quantity of "AB (space) CD" is 2, a quantity of "ABC (space) D" is 3, a quantity of "A (space) BCD" is 1, and a quantity of "A (space) BC (space) D" is 1. Therefore, the occurrence frequency of "ABC (SPACE) D" is the highest in the phrase set, i.e., three out of seven, and the occurrence frequency of "AB (space) CD" is the second highest, i.e., is two out of seven. The top n phrases are selected as the candidate word segments. N may be the same as or different from m. N is a natural number. In the case that n is 2, in the above example, "ABC (space) D" and "AB (space) CD" are selected as the candidate word segments.

A principle of processing the LRL data to acquire the plurality of candidate word segments is substantially the same as that of processing the HRL data to acquire the first word segmentation language data. In another implementation, step 102 is also further refined. As shown in FIG. 4, steps 1022 and 1023 in FIG. 3 are replaced by steps 1024 and 1025. In 1024, all spaces in any phrase are removed to form a keyword. In 1025, spaces are added to the keyword by dynamic programming to form all possible word segments as the candidate word segments.

This implementation is the same as the above implementation in that each group of preprocessed LRL data needs to be converted into a plurality of groups of short sentences, and all spaces in any phrase are removed to form the keyword. In the above implementation, it is not stated that spaces in any phrase are removed to form the keyword, but this operation is actually performed. This is embodied in grouping the phrases in one group of short sentences, which is essentially forming a keyword by removing spaces from the phrases, and phrases corresponding to the same keyword are grouped together. In the embodiments, the keyword is formed, but the phrases are not grouped based on the keyword. In the case that the keyword is formed, spaces are added to the keyword by dynamic programming to form all possible word segments as the candidate word segments. Dynamic programming is a basic idea of programming that is often used in programming. For example, the keyword is ABCD, and spaces are dynamically added to form "A (space) BCD", "AB (space) CD", "ABC (space) D", "ABCD", "A B CD", "A (space) BC (space) D", "AB C D", and "A B C D". "A (space) BCD", "AB (space) CD", "ABC (space) D", "ABCD", "A B CD", "A (space) BC (space) D", "AB C D", and "A B C D" are all determined as the candidate word segments.

In some embodiments, selecting the second word segmentation language data from the plurality of candidate word segments based on the matching degree between each of the candidate word segments and the first word segmentation corpus includes:

translating the plurality of candidate word segments into a plurality of high-resource candidate word segments corresponding to the HRL data through a translation model; acquiring an occurrence frequency of a group of first word segmentation language data consistent with the high-resource candidate word segment in the first word segmentation corpus; determining frequency index is calculated based on the translation probability of the high-resource candidate word segment and the occurrence frequency of the group of first word segmentation language data consistent with the high-resource candidate word segment in the first word segmentation corpus; and determining the high-resource candidate word segment corresponding to the group of first word segmentation language data with the highest frequency index is determined as the second word segmentation language data. There are many ways to calculate the frequency index, which are not limited in the present disclosure. For example, the frequency index is acquired by adding the occurrence frequency and the translation probability.

In the embodiments, the applied translation model is an existing and commonly used one in the market, such as Transformer, RNN-encoder-decoder, or Attention. In the embodiments, an LRL is converted into an HRL through the translation model. The translation model is usually embodied as translation software, and is carried on a web page or an intelligent terminal as a client. The translation model often provides an interactive operation interface for a user to perform visual translation. For example, a candidate word segment abcd needs to be translated into ABCD in the HRL. The abcd and ABCD often express a same meaning, but are different expressions of two different languages. For example, "happy birthday day" may be translated into "zhu ni sheng ri kuai le" or "zhu ni sheng ri kai xin" in Chinese. The translation results essentially express the same meaning, but words, expressions, and the like are different. Different translation results acquired through the translation model correspond to different translation probabilities. The translation probabilities and the translation results are simultaneously displayed.

According to the above steps, because sufficient HRL data is acquired, the rich first word segmentation corpus has been formed. In the embodiments, the occurrence frequency of the group of first word segmentation language data that is the same as the high-resource candidate word segment in the first word segmentation corpus is acquired. For example, in the case that a quantity of ABCD in the first word segmentation corpus is 15, a quantity of the high-resource candidate word segment ABCD in the HRL to which abcd in the LRL is translated and that is matched in the first word segmentation corpus is 15, and the matching frequency is 15. It is assumed that there are M phrases in the first word segmentation corpus, wherein M is a natural number. In this case, the occurrence frequency of ABCD is 15/M. It is assumed that the high-resource candidate word segments to which the candidate word segment is translated include "A (space) BCD" and "ABC (space) D", 12 and 23 of which are respectively matched in the first word segmentation corpus. Obviously, the occurrence frequency of "ABC (space) D" is higher than that of "A (space) BCD". Therefore, "ABC (space) D" is determined as the second word segmentation language data.

In 103, training is performed based on the second word segmentation language data to acquire a word segmentation model, and a plurality of groups of to-be-segmented data are input into the word segmentation model to output a plurality of candidate word segmentation results.

In the embodiments of the present disclosure, in step 103, the training is performed based on the second word segmentation language data to acquire the word segmentation model and the plurality of groups of to-be-segmented data are input into the word segmentation model to output the plurality of candidate word segmentation results. As shown in FIG. 5, step 103 includes two sub-steps. In 1031, the second word segmentation language data is input as training data into a preset conditional random field (CRF) model for training to acquire the word segmentation model. In 1032, the plurality of groups of to-be-segmented data are input into the word segmentation model to output the plurality of candidate word segmentation results.

CRF model is a conditional random field model, in the present disclosure, the CRF model is used as a basis of the model, and the training data is input into the CRF model to train the model. The second word segmentation language data acquired in the previous step is determined as the training data. A in the case that the word segmentation model is trained, when the to-be-segmented data is input, a plurality of candidate word segmentation results may be automatically output. A quantity of the candidate word segmentation results may be set based on an actual situation, for example, 5. Certainly, the quantity may be another value, which is not limited in the present disclosure. It should be noted that one of the objectives of the present disclosure is to provide convenience to LRL regions through a series of methods and associate LRLs based on HRLs, which facilitates word segmentation of LRLs. Therefore, in the embodiments, the to-be-segmented data is often LRL data.

In 104, the candidate word segmentation result with a highest matching degree is selected as a word segmentation result based on a matching degree between each of the candidate word segmentation results and the first word segmentation corpus.

In some embodiments, as shown in FIG. 5, selecting the candidate word segmentation result with the highest matching degree as the word segmentation result based on the matching degree between each of the candidate word segmentation results and the first word segmentation corpus includes: in 1041, acquiring occurrence frequencies of the groups of first word segmentation language data consistent with the candidate word segmentation results in the first word segmentation corpus; and in 1042, determining the candidate word segmentation result corresponding to the group of first word segmentation language data with the highest occurrence frequency as the word segmentation result.

The final word segmentation result is selected based on the occurrence frequency in the first word segmentation corpus as the matching degree. Because the to-be-segmented data may be LRL data, the corresponding candidate word segmentation results are also LRL data. Herein, the candidate word segmentation results is translated into the HRL through the translation model. The first word segmentation language data consistent with translated candidate word segmentation results in the first word segmentation corpus is matched, and the occurrence frequencies are acquired. The candidate word segmentation result corresponding to the first word segmentation language data with the highest occurrence frequency is determined as the word segmentation result.

Figure 6:
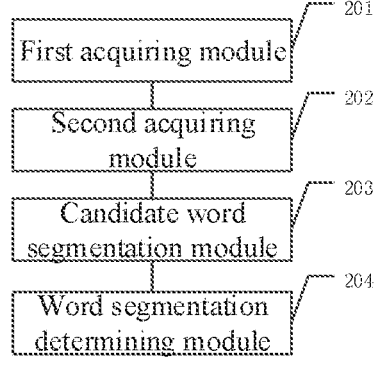
FIG. 6 is a schematic structural diagram of an apparatus for segmenting words based on cross-language data augmentation according to some embodiments of the present disclosure.

According to another aspect, FIG. 6 shows an apparatus for segmenting words based on cross-language data augmentation according to some embodiments of the present disclosure. As shown in FIG. 6, the apparatus for segmenting words based on cross-language data augmentation includes a first acquiring module 201, a second acquiring module 202, a candidate word segmentation module 203, and a word segmentation determining module 204. The first acquiring module 201 is configured to acquire a plurality of groups of HRL data, and acquire a plurality of groups of first word segmentation language data by processing the plurality of groups of HRL data. The plurality of groups of first word segmentation language data constitute a first word segmentation corpus. The second acquiring module 202 is configured to acquire a plurality of groups of LRL data, acquire a plurality of candidate word segments by processing the LRL data, and select second word segmentation language data from the plurality of candidate word segments based on a matching degree between each of the candidate word segments and the first word segmentation corpus. The candidate word segmentation module 203 is configured to acquire a word segmentation model by training based on the second word segmentation language data, and output a plurality of candidate word segmentation results by inputting a plurality of groups of to-be-segmented data into the word segmentation model. The word segmentation determining module 204 is configured to select the candidate word segmentation result with a highest matching degree as a word segmentation result based on a matching degree between each of the candidate word segmentation results and the first word segmentation corpus.

In some embodiments, in the first acquiring module 201, acquiring the plurality of groups of the first word segmentation language data by processing the plurality of groups of HRL data includes: preprocessing the plurality of groups of HRL data; converting each group of preprocessed HRL data into a plurality of groups of short sentences, wherein each group of the short sentences includes a plurality of phrases each with a same quantity of language units, organizing phrases including identical language units into one phrase set, wherein the phrase set includes a plurality of types of phrases; acquiring occurrence frequencies of the plurality of types of phrases in the phrase set; and selecting top m types of phrases as the first word segmentation language data based on the descending order of the occurrence frequency.

The preprocessing includes: converting a punctuation mark in the HRL data based on a first preset rule, and converting an emoticon in the HRL data into a language unit based on a second preset rule.

Selecting top m types of phrases as the first word segmentation language data based on the descending order of the occurrence frequency includes: selecting the top m types of phrases as candidate first word segmentation language data based on the descending order of the occurrence frequency; randomly selecting a phrase from the phrase set, and forming a keyword by removing all spaces in the phrase; outputting predicted word segmentation language data by inputting the keyword into a preset word segmentation model; comparing the candidate first word segmentation language data with the predicted word segmentation language data, and in response to the candidate first word segmentation language data being the same as the predicted word segmentation language data, determining the candidate first word segmentation language data as the first word segmentation language data; or in response to the candidate first word segmentation language data being different from the predicted word segmentation language data, selecting the first word segmentation language data from the candidate first word segmentation language data and the predicted word segmentation language data based on a preset word selection rule.

In the second acquiring module 202, acquiring the plurality of candidate word segments by processing the LRL data includes: preprocessing the plurality of groups of LRL data; converting each group of preprocessed LRL data into a plurality of groups of short sentences, wherein each group of the short sentences includes a plurality of phrases each with a same quantity of language units; organizing phrases including identical language units into one phrase set, wherein the phrase set includes a plurality of types of phrases; and acquiring occurrence frequencies of the plurality of types of phrases in the phrase set, and selecting top n types of phrases as the candidate word segments based on a descending order of the occurrence frequency.

The preprocessing includes converting a punctuation mark in the LRL data based on a first preset rule, and converting an emoticon in the HRL data into a language unit based on a second preset rule.

In the second acquiring module 202, acquiring the plurality of candidate word segments by processing the LRL data s may include: preprocessing the plurality of groups of LRL data; converting each group of preprocessed LRL data into a plurality of groups of short sentences, wherein each group of the short sentences includes a plurality of phrases each with a same quantity of language units; forming a keyword by and removing all spaces in any phrase; and forming all possible word segments as the candidate word segments by adding spaces to the keyword by dynamic programming.

Selecting the second word segmentation language data from the plurality of candidate word segments based on the matching degree between each of the candidate word segments and the first word segmentation corpus includes: translating the plurality of candidate word segments into a plurality of high-resource candidate word segments corresponding to the HRL data through a translation model; acquiring an occurrence frequency of a group of first word segmentation language data consistent with the high-resource candidate word segment in the first word segmentation corpus; and determining the high-resource candidate word segment corresponding to the group of first word segmentation language data with a highest frequency index as the second word segmentation language data.

In some embodiments, acquiring the word segmentation model by training based on the second word segmentation language data is inputting the second word segmentation language data as training data into a preset CRF model for training to acquire the word segmentation model. Selecting the candidate word segmentation result with the highest matching degree as the word segmentation result based on the matching degree between each of the candidate word segmentation results and the first word segmentation corpus includes: acquiring occurrence frequencies of the groups of first word segmentation language data consistent with the candidate word segmentation results in the first word segmentation corpus; and determining the candidate word segmentation result corresponding to the group of first word segmentation language data with a highest occurrence frequency as the word segmentation result.

Figure 7:
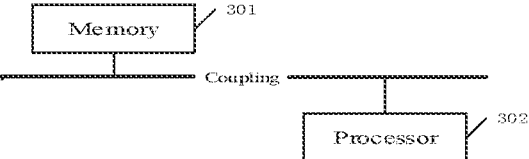
FIG. 7 is a schematic structural diagram of a device for segmenting words based on cross-language data augmentation according to some embodiments of the present disclosure.

As shown in FIG. 7, the embodiments of the present disclosure further provide a device for segmenting words based on cross-language data augmentation, including a memory 301 and one or more processors 302. The memory 301 is configured to store one or more programs. The one or more processors 302, when loading and running the one or more programs, are caused to perform the method for segmenting words based on cross-language data augmentation in the present disclosure.

The embodiments of the present disclosure further provide a storage medium containing a computer-executable instruction. The computer-executable instruction, when loaded and run by a computer processor, causes the computer processor to perform the method for segmenting words based on cross-language data augmentation provided in the above embodiments.

Certainly, in the storage medium containing the computer-executable instruction provided in the embodiments of the present disclosure, the computer-executable instruction of the storage medium is not limited to the above method for segmenting words based on cross-language data augmentation, and may further perform operations related to the method for segmenting words based on cross-language data augmentation provided in any embodiment of the present disclosure.

The embodiments of the present disclosure further provide a program for segmenting words based on cross-language data augmentation. When the program is loaded and run, operations related to the method for segmenting words based on cross-language data augmentation in the above embodiments are performed.

The foregoing is merely the preferred embodiments of the present disclosure and the technical principle in use. The present disclosure is not limited to the specific embodiments described herein, and various obvious changes, adjustments, and substitutions can be made by those skilled in the art, and do not depart from the protection scope of the present disclosure. Therefore, although the present disclosure has been described in detail by using the foregoing embodiments, the present disclosure is not limited to the foregoing embodiments, and can also include more other equivalent embodiments without departing from the concept of the present disclosure, and the scope of the present disclosure is determined by the scope of the appended claims.

What is claimed is:

1. A method for segmenting words based on cross-language data augmentation, applied to a server, the method comprising:

acquiring a plurality of groups of high-resource language (HRL) data, and acquiring a plurality of groups of first word segmentation language data by processing the plurality of groups of HRL data, wherein the plurality of groups of first word segmentation language data constitute a first word segmentation corpus;

acquiring a plurality of groups of low-resource language (LRL) data, acquiring a plurality of candidate word segments by processing the plurality of groups of LRL data;

selecting second word segmentation language data from the plurality of candidate word segments based on a matching degree between each of the candidate word segments and the first word segmentation corpus;

acquiring a word segmentation model by training based on the second word segmentation language data, and outputting a plurality of candidate word segmentation results by inputting a plurality of groups of to-be-segmented data into the word segmentation model; and selecting the candidate word segmentation result with a highest matching degree as a word segmentation result based on a matching degree between each of the candidate word segmentation results and the first word segmentation corpus;

wherein selecting the second word segmentation language data from the plurality of candidate word segments based on the matching degree between each of the candidate word segments and the first word segmentation corpus comprises:

translating the plurality of candidate word segments into a plurality of high-resource candidate word segments corresponding to the HRL data through a translation model, wherein each of the high-resource candidate word segments corresponds to a translation probability assigned by the translation model;

acquiring an occurrence frequency of a group of first word segmentation language data consistent with the high-resource candidate word segment in the first word segmentation corpus;

calculating a frequency index by adding the translation probability of the high-resource candidate word segment and the occurrence frequency of the group of first word segmentation language data consistent with the high-resource candidate word segment in the first word segmentation corpus; and determining the high-resource candidate word segment corresponding to the group of first word segmentation language data with a highest frequency index as the second word segmentation language data.

2. The method according to claim 1, wherein acquiring the plurality of groups of the first word segmentation language data by processing the plurality of groups of HRL data comprises:

preprocessing the plurality of groups of HRL data;

converting each group of preprocessed HRL data into a plurality of groups of short sentences, wherein each group of the short sentences comprises a plurality of phrases each having a same quantity of language units;

segmenting phrases comprising identical language units into one phrase set, wherein the phrase set comprises a plurality of types of phrases; and acquiring occurrence frequencies of the plurality of types of phrases in the phrase set, and selecting top m types of phrases as the first word segmentation language data based on a descending order of the occurrence frequencies.

3. The method according to claim 2, wherein preprocessing the plurality of groups of HRL data comprises: converting punctuation marks in the HRL data according to a first preset rule and/or converting emoticons in the HRL data into language units according to a second preset rule.

4. The method according to claim 2, wherein selecting the top m types of phrases as the first word segmentation language data based on the descending order of the occurrence frequencies comprises:

selecting the top m types of phrases as candidate first word segmentation language data in the descending order of the occurrence frequencies;

randomly selecting a phrase from the phrase set, and forming a keyword by removing all spaces in the phrase;

outputting predicted word segmentation language data by inputting the keyword into a preset word segmentation model; and comparing the candidate first word segmentation language data with the predicted word segmentation language data, and in response to the candidate first word segmentation language data being the same as the predicted word segmentation language data, determining the candidate first word segmentation language data as the first word segmentation language data, or in response to the candidate first word segmentation language data being different from the predicted word segmentation language data, adjusting the candidate first word segmentation language data and determining the adjusted candidate first word segmentation language data as the first word segmentation language data.

5. The method according to claim 1, wherein acquiring the plurality of candidate word segments by processing the LRL data comprises:

preprocessing the plurality of groups of LRL data;

converting each group of preprocessed LRL data into a plurality of groups of short sentences, wherein each group of the short sentences comprises a plurality of phrases each having a same quantity of language units;

organizing phrases comprising identical language units into one phrase set, wherein the phrase set comprises a plurality of types of phrases; and acquiring occurrence frequencies of the plurality of types of phrases in the phrase set, and selecting top n types of phrases as the candidate word segments based on a descending order of the occurrence frequencies.

6. The method according to claim 1, wherein acquiring the plurality of candidate word segments by processing the LRL data comprises:

preprocessing the plurality of groups of LRL data;

converting each group of preprocessed LRL data into a plurality of groups of short sentences, wherein each group of the short sentences comprises a plurality of phrases each having a same quantity of language units;

forming a keyword by removing all spaces in any phrase; and forming all possible word segments as the candidate word segments by adding spaces to the keyword by dynamic programming.

7. The method according to claim 1, wherein acquiring the word segmentation model by training based on the second word segmentation language data comprises:

acquiring the word segmentation model by inputting the second word segmentation language data as training data into a preset conditional random field (CRF) model for training.

8. The method according to claim 1, wherein the selecting the candidate word segmentation result with the highest matching degree as the word segmentation result based on the matching degree between each of the candidate word segmentation results and the first word segmentation corpus comprises:

acquiring occurrence frequencies of the groups of first word segmentation language data consistent with the candidate word segmentation results in the first word segmentation corpus; and determining the candidate word segmentation result corresponding to the group of first word segmentation language data with a highest occurrence frequency as the word segmentation result.

9. A device for segmenting words based on cross-language data augmentation, comprising a memory and one or more processors; wherein the memory is configured to store one or more programs; and the one or more processors, when loading and running the one or more programs, are caused to perform a method for segmenting words based on cross-language data augmentation, wherein the method comprises:

acquiring a plurality of groups of high-resource language (HRL) data, and acquiring a plurality of groups of first word segmentation language data by processing the plurality of groups of HRL data, wherein the plurality of groups of first word segmentation language data constitute a first word segmentation corpus;

acquiring a plurality of groups of low-resource language (LRL) data, acquiring a plurality of candidate word segments by processing the plurality of groups of LRL data;

selecting second word segmentation language data from the plurality of candidate word segments based on a matching degree between each of the candidate word segments and the first word segmentation corpus;

acquiring a word segmentation model by training based on the second word segmentation language data, and outputting a plurality of candidate word segmentation results by inputting a plurality of groups of to-be-segmented data into the word segmentation model; and selecting the candidate word segmentation result with a highest matching degree as a word segmentation result based on a matching degree between each of the candidate word segmentation results and the first word segmentation corpus;

wherein selecting the second word segmentation language data from the plurality of candidate word segments based on the matching degree between each of the candidate word segments and the first word segmentation corpus comprises:

translating the plurality of candidate word segments into a plurality of high-resource candidate word segments corresponding to the HRL data through a translation model, wherein each of the high-resource candidate word segments corresponds to a translation probability assigned by the translation model;

acquiring an occurrence frequency of a group of first word segmentation language data consistent with the high-resource candidate word segment in the first word segmentation corpus;

calculating a frequency index by adding the translation probability of the high-resource candidate word segment and the occurrence frequency of the group of first word segmentation language data consistent with the high-resource candidate word segment in the first word segmentation corpus; and determining the high-resource candidate word segment corresponding to the group of first word segmentation language data with a highest frequency index as the second word segmentation language data.

10. A non-volatile computer-readable storage medium containing one or more computer-executable instructions, wherein the one or more computer-executable instructions, when loaded and run by a computer processor, cause the computer processor to perform a method for segmenting words based on cross-language data augmentation, wherein the method comprises:

acquiring a plurality of groups of high-resource language (HRL) data, and acquiring a plurality of groups of first word segmentation language data by processing the plurality of groups of HRL data, wherein the plurality of groups of first word segmentation language data constitute a first word segmentation corpus;

acquiring a plurality of groups of low-resource language (LRL) data, acquiring a plurality of candidate word segments by processing the plurality of groups of LRL data;

selecting second word segmentation language data from the plurality of candidate word segments based on a matching degree between each of the candidate word segments and the first word segmentation corpus;

acquiring a word segmentation model by training based on the second word segmentation language data, and outputting a plurality of candidate word segmentation results by inputting a plurality of groups of to-be-segmented data into the word segmentation model; and selecting the candidate word segmentation result with a highest matching degree as a word segmentation result based on a matching degree between each of the candidate word segmentation results and the first word segmentation corpus;

wherein selecting the second word segmentation language data from the plurality of candidate word segments based on the matching degree between each of the candidate word segments and the first word segmentation corpus comprises:

translating the plurality of candidate word segments into a plurality of high-resource candidate word segments corresponding to the HRL data through a translation model, wherein each of the high-resource candidate word segments corresponds to a translation probability assigned by the translation model;

acquiring an occurrence frequency of a group of first word segmentation language data consistent with the high-resource candidate word segment in the first word segmentation corpus;

calculating a frequency index by adding the translation probability of the high-resource candidate word segment and the occurrence frequency of the group of first word segmentation language data consistent with the high-resource candidate word segment in the first word segmentation corpus; and determining the high-resource candidate word segment corresponding to the group of first word segmentation language data with a highest frequency index as the second word segmentation language data.

11. The device according to claim 9, wherein acquiring the plurality of groups of the first word segmentation language data by processing the plurality of groups of HRL data comprises:

preprocessing the plurality of groups of HRL data;

converting each group of preprocessed HRL data into a plurality of groups of short sentences, wherein each group of the short sentences comprises a plurality of phrases each having a same quantity of language units;

segmenting phrases comprising identical language units into one phrase set, wherein the phrase set comprises a plurality of types of phrases; and acquiring occurrence frequencies of the plurality of types of phrases in the phrase set, and selecting top m types of phrases as the first word segmentation language data based on a descending order of the occurrence frequencies.

12. The device according to claim 11, wherein preprocessing the plurality of groups of HRL data comprises: converting punctuation marks in the HRL data according to a first preset rule and/or converting emoticons in the HRL data into language units according to a second preset rule.

13. The device according to claim 11, wherein selecting the top m types of phrases as the first word segmentation language data based on the descending order of the occurrence frequencies comprises:

selecting the top m types of phrases as candidate first word segmentation language data in the descending order of the occurrence frequencies;

randomly selecting a phrase from the phrase set, and forming a keyword by removing all spaces in the phrase;

outputting predicted word segmentation language data by inputting the keyword into a preset word segmentation model; and comparing the candidate first word segmentation language data with the predicted word segmentation language data, and in response to the candidate first word segmentation language data being the same as the predicted word segmentation language data, determining the candidate first word segmentation language data as the first word segmentation language data, or in response to the candidate first word segmentation language data being different from the predicted word segmentation language data, adjusting the candidate first word segmentation language data and determining the adjusted candidate first word segmentation language data as the first word segmentation language data.

14. The device according to claim 9, wherein acquiring the plurality of candidate word segments by processing the LRL data comprises:

preprocessing the plurality of groups of LRL data;

converting each group of preprocessed LRL data into a plurality of groups of short sentences, wherein each group of the short sentences comprises a plurality of phrases each having a same quantity of language units;

organizing phrases comprising identical language units into one phrase set, wherein the phrase set comprises a plurality of types of phrases; and acquiring occurrence frequencies of the plurality of types of phrases in the phrase set, and selecting top n types of phrases as the candidate word segments based on a descending order of the occurrence frequencies.

15. The device according to claim 9, wherein acquiring the plurality of candidate word segments by processing the LRL data comprises:

preprocessing the plurality of groups of LRL data;

converting each group of preprocessed LRL data into a plurality of groups of short sentences, wherein each group of the short sentences comprises a plurality of phrases each having a same quantity of language units;

forming a keyword by removing all spaces in any phrase; and forming all possible word segments as the candidate word segments by adding spaces to the keyword by dynamic programming.

16. The device according to claim 9, wherein acquiring the word segmentation model by training based on the second word segmentation language data comprises:

acquiring the word segmentation model by inputting the second word segmentation language data as training data into a preset conditional random field (CRF) model for training.

17. The device according to claim 9, wherein the selecting of the candidate word segmentation result with the highest matching degree as the word segmentation result based on the matching degree between each of the candidate word segmentation results and the first word segmentation corpus comprises:

acquiring occurrence frequencies of the groups of first word segmentation language data consistent with the candidate word segmentation results in the first word segmentation corpus; and determining the candidate word segmentation result corresponding to the group of first word segmentation language data with a highest occurrence frequency as the word segmentation result.

* * * * *